(12) United States Patent
Nakamura

(10) Patent No.: US 12,391,508 B2
(45) Date of Patent: *Aug. 19, 2025

(54) MEDIUM DISCHARGE DEVICE AND IMAGE READING APPARATUS

(71) Applicant: SEIKO EPSON CORPORATION, Tokyo (JP)

(72) Inventor: Kiyotaka Nakamura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,280

(22) Filed: Jun. 5, 2024

(65) Prior Publication Data

US 2024/0317530 A1    Sep. 26, 2024

Related U.S. Application Data

(63) Continuation of application No. 18/311,734, filed on May 3, 2023, now Pat. No. 12,024,387, which is a
(Continued)

(30) Foreign Application Priority Data

Oct. 16, 2015    (JP) .................. 2015-204370

(51) Int. Cl.
*B65H 31/14*    (2006.01)
*B65H 29/12*    (2006.01)
(Continued)

(52) U.S. Cl.
CPC ............. *B65H 31/14* (2013.01); *B65H 29/12* (2013.01); *B65H 29/14* (2013.01); *B65H 31/02* (2013.01);
(Continued)

(58) Field of Classification Search
CPC ........ B65H 31/14; B65H 31/18; B65H 31/10; B65H 31/12; B65H 2405/111;
(Continued)

(56) References Cited

U.S. PATENT DOCUMENTS 3,458,187 A    7/1969    Draugelis et al.
4,441,702 A    4/1984    Nagel et al.
(Continued)

FOREIGN PATENT DOCUMENTS

CN    102227366    10/2011
EP    2354067    8/2011
(Continued)

*Primary Examiner* — Jeremy R Severson
(74) *Attorney, Agent, or Firm* — WORKMAN NYDEGGER

(57) ABSTRACT

A medium discharge device includes a discharge roller pair that is provided with a discharge driving roller and a discharge driven roller which drivably rotates in contact with the discharge driving roller, and a medium receiving tray which receives the medium that is fed and discharged by the discharge roller pair, in which the medium receiving tray includes a guide member which guides such that a tip end of the medium which is discharged from the discharge roller pair enters the medium mounting surface at a predetermined angle, and the guide member is provided to be elastically displaceable in an advancing and retreating direction with respect to the medium mounting surface of the medium receiving tray and is displaced in a direction coming close to the medium mounting surface according to raising of a pressing load due to the medium that is discharged to the medium receiving tray.

7 Claims, 17 Drawing Sheets

Related U.S. Application Data continuation of application No. 17/107,528, filed on Nov. 30, 2020, now Pat. No. 11,673,760, which is a continuation of application No. 16/268,277, filed on Feb. 5, 2019, now Pat. No. 10,968,066, which is a continuation of application No. 15/893,980, filed on Feb. 12, 2018, now Pat. No. 10,227,200, which is a continuation of application No. 15/294,469, filed on Oct. 14, 2016, now Pat. No. 9,938,107.

(51) Int. Cl.
  *B65H 29/14* (2006.01)
  *B65H 31/02* (2006.01)
  *H04N 1/12* (2006.01)

(52) U.S. Cl.
  CPC ....... *H04N 1/1215* (2013.01); *B65H 2220/09* (2013.01); *B65H 2301/4212* (2013.01); *B65H 2405/1111* (2013.01); *B65H 2405/11162* (2013.01); *B65H 2405/11164* (2013.01); *B65H 2405/1119* (2013.01); *B65H 2405/32* (2013.01); *B65H 2405/324* (2013.01); *B65H 2801/12* (2013.01); *B65H 2801/39* (2013.01); *H04N 2201/0081* (2013.01)

(58) Field of Classification Search
  CPC .... B65H 2405/1111; B65H 2405/1112; B65H 2405/14; B65H 2405/141; B65H 2405/1412; B65H 2405/142; B65H 29/12; B65H 31/02; B65H 2301/4212; B65H 2405/11164; B65H 2405/32; B65H 2801/12; B65H 2801/39
  See application file for complete search history.

(56) References Cited

U.S. PATENT DOCUMENTS

| | | | |
|---|---|---|---|
| 5,280,897 | A | 1/1994 | Maekawa |
| 6,631,902 | B1 | 10/2003 | Beauchamp |
| 7,448,617 | B2 | 11/2008 | Fujioka |
| 7,748,705 | B2 | 7/2010 | Yamada |
| 11,673,760 | B2 * | 6/2023 | Nakamura ............. B65H 31/14 347/116 |
| 12,024,387 | B2 * | 7/2024 | Nakamura ............. B65H 29/12 |
| 2004/0145112 | A1 | 7/2004 | Matsutomo et al. |
| 2005/0052517 | A1 | 3/2005 | Fujioka et al. |
| 2006/0017219 | A1 | 1/2006 | Yamada |
| 2007/0090590 | A1 | 4/2007 | Doery |
| 2008/0122164 | A1 | 5/2008 | Sparer et al. |
| 2014/0063573 | A1 | 3/2014 | Yonemura et al. |
| 2017/0107072 | A1 | 4/2017 | Nakamura |

FOREIGN PATENT DOCUMENTS

| | | |
|---|---|---|
| JP | H03-018057 | 2/1991 |
| JP | H05-105305 | 4/1993 |
| JP | H06-156856 | 6/1994 |
| JP | H11-165935 | 6/1999 |
| JP | 2000-038247 | 2/2000 |
| JP | 2000038247 A * | 2/2000 |
| JP | 2000-327204 | 11/2000 |
| JP | 2004-026370 | 1/2004 |
| JP | 2004-043131 | 2/2004 |
| JP | 2006-027758 | 2/2006 |
| JP | 2007-176693 | 7/2007 |
| JP | 2014-051338 | 3/2014 |

\* cited by examiner

Prior Art

MEDIUM DISCHARGE DEVICE AND IMAGE READING APPARATUS

BACKGROUND

1. Technical Field

The present invention relates to a medium discharge device that stacks and discharges a medium to externally to the apparatus and an image reading apparatus which is provided with the medium discharge device.

2. Related Art

An automatic feeding device of a document as the medium (referred to as an auto document feeder (ADF)) is provided in a scanner that is an example of the image reading apparatus, and is configured to perform automatic feeding and reading of a plurality of documents. The plurality of fed documents are read in an image reading portion that is provided on a transport direction downstream side of the auto document feeder.

In such a scanner, the medium discharge device may be provided that is configured such that a discharge roller pair is provided on the downstream side of the image reading portion, the documents are discharged externally to the apparatus, and a plurality of discharged documents which are received are stacked in discharge order to a discharge paper receiving tray (also referred to as a discharge paper stacker and the like).

For example, JP-A-2014-051338 discloses a medium discharge device with a configuration in which paper sheets are discharged outside of an apparatus by a second transport roller 140 and a second driven roller 141 which are provided on the downstream side of an imaging portion 130 as the image reading portion, and paper sheets are stacked on a front surface cover 105a, an upper surface cover 105b, and an auxiliary cover 105c as the discharge paper receiving tray.

In such a medium discharge device, there is a configuration in which since a plurality of sheets of the medium are stacked in the discharge paper receiving tray, as shown in FIG. 17, after a medium mounting surface 100a of the discharge paper receiving tray 100 is provided further on the lower side than the discharge roller pair 102 and the medium (reference numeral P) is fed from the discharge roller pair 102, the medium is held a predetermined distance L from the discharge roller pair 102 and is landed and discharged on the medium mounting surface 100a of the discharge paper receiving tray 100 at a predetermined angle $\theta 1$.

Here, in a case where resilience of the medium P is strong, that is, in a case where the medium has high rigidity, a tip end of the medium P which is fed from the discharge roller pair 102 progresses approximately straight up to a landing point A, and is landed on the medium mounting surface 100a at the angle $\theta 1$. After landing of the tip end of the medium P, the medium P is further fed and discharged by the discharge roller pair 102, and is mounted in the discharge paper receiving tray 100.

Meanwhile, in a case where resilience of the medium is weak, that is, in a case where there is a medium P' with low rigidity such as thin paper (indicated by a dotted line in FIG. 17), the medium P' which is fed from the discharge roller pair 102 may hang down under self weight prior to reaching the landing point A, and land further on the upstream side in the medium transport direction upstream side than the landing point A (for example, landing point B in FIG. 17) at an angle $\theta 2$ which is larger than the angle $\theta 1$.

When landing on the medium mounting surface 100a with the tip end of the medium P' with weak resilience at the large angle $\theta 2$, and the medium P' is further fed to the downstream side by the discharge roller pair 102, there is a risk that the tip end of the medium P' is caught and buckles on the medium mounting surface 100a. When the already discharged medium buckles, a concern that a defect such as jamming due to impact with the medium that is buckled by a subsequent medium, or reversing of loading order increases.

SUMMARY

An advantage of some aspects of the invention is to reduce or avoid a concern of a medium buckling during discharge of the medium on a discharge paper receiving tray, and appropriately discharge a plurality of media stacked in the discharge paper receiving tray.

According to a first aspect of the invention, there is provided a medium discharge device including a discharge roller pair that is provided with a discharge driving roller which feeds a medium by being driven with motive force of a driving source and a discharge driven roller which drivably rotates in contact with the discharge driving roller, and a medium receiving tray which receives the medium that is fed and discharged by the discharge roller pair, in which the medium receiving tray includes a guide member which guides such that a tip end of the medium which is discharged from the discharge roller pair enters a medium mounting surface at a predetermined angle, and the guide member is provided elastically displaceable in an advancing and retreating direction with respect to the medium mounting surface of the medium receiving tray and displaced in a direction coming close to the medium mounting surface according to raising of a pressing load due to the medium that is discharged to the medium receiving tray.

According to the aspect, since it is possible to guide the medium that is discharged from the discharge roller pair using the guide member and land on the medium mounting surface of the medium receiving tray at a predetermined entrance angle, it is possible to reduce or avoid a concern of the medium with weak resilience (with low rigidity) buckling during discharge of the medium on a medium receiving tray. Thereby, it is possible to suppress a concern that a subsequent medium is jammed and appropriately stack the media in the medium receiving tray.

Additionally, the guide member is elastically displaced in the advancing and retreating direction with respect to the medium mounting surface of the medium receiving tray and is displaced in a direction coming close to the medium mounting surface according to raising of a pressing load due to the medium that is discharged to the medium receiving tray. That is, when the discharged number of sheets of media is great, the guide member is displaced so as to come close to the medium mounting surface. Consequently, it is possible to secure a loading space in a height direction (direction perpendicular to the medium mounting surface) in the medium receiving tray.

In the medium discharge device according to the second aspect, the guide member is formed on a downward slope extending on the medium mounting surface of the medium receiving tray from a transport direction upstream side, at the predetermined angle.

According to the aspect, it is possible to reliably guide the medium which is discharged from the discharge roller pair so as to enter the medium mounting surface of the medium receiving tray at the predetermined angle.

In the medium discharge device according to the third aspect, the guide member is provided with respect to a portion of a width direction which intersects with the medium transport direction on the medium receiving tray.

According to the aspect, it is possible to more easily perform adjustment of elastic force of the guide member than in a case where the guide member is provided across the width direction by partially providing the guide member in the width direction. In addition, it is possible to provide the guide member with a simple configuration and at low cost.

In the medium discharge device according to the fourth aspect, the guide member is provided in a center portion in the width direction.

According to the aspect, it is possible for the guide member to reliably guide the medium which is discharged from the discharge roller pair in the center portion in the width direction which intersects with the medium transport direction in the medium receiving tray. In particular, it is possible to effectively guide the medium in a case where the medium is disposed on the center portion and fed in the direction which intersects with the medium transport direction, and the medium is transported from the upstream side of the medium discharge device by so-called center feeding.

In the medium discharge device according to the fifth aspect, the guide member guides the medium at at least two locations in the width direction.

According to the aspect, it is possible for the guide member to stably transport the medium since the guide member supports and guides the medium at at least two locations in the width direction.

In the medium discharge device according to the sixth aspect, the guide member is configured by a leaf spring.

According to the aspect, it is possible to simply and inexpensively realize a configuration in which the guide member is elastically displaced in the advancing and retreating direction with respect to the medium mounting surface of the medium receiving tray and is displaced in a direction coming close to the medium mounting surface according to raising of a pressing load due to the medium that is discharged to the medium receiving tray.

According to a seventh aspect of the invention, there is provided an image reading apparatus including an apparatus main body which is provided with a reading portion that reads a medium, and the medium discharge device according to any one of the first to sixth aspects which discharges the medium that is read by the reading portion externally to the apparatus main body.

According to the aspect, in the image reading apparatus which is provided with the reading portion that reads the medium within the apparatus main body, when the medium is fed toward the reading portion, the same actions and effects are obtained as any one of the first to fourth aspects.

In the image reading apparatus according to the eighth aspect, the medium receiving tray is able to be accommodated in an accommodating portion which is provided within the apparatus main body, and the guide member is displaced in a direction coming close to the medium mounting surface in conjunction with an accommodating operation to the accommodating portion of the medium receiving tray and is accommodated in the accommodating portion along with the medium receiving tray.

According to the other aspect, when the medium receiving tray is accommodated in the accommodating portion within the apparatus main body, it is possible to accommodate the guide member together in the accommodating portion. At that time, since the guide member is displaced in the direction coming close to the medium mounting surface, it is possible to accommodate the guide member to save space.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment 1

First, an outline of a recording apparatus according to an embodiment of the invention will be described. An example is given of a document scanner (hereinafter referred to simply as a scanner 10) that is able to read at least one surface of a front surface and a rear surface of the medium as an example of an image reading apparatus of the embodiment.

Figure 1:
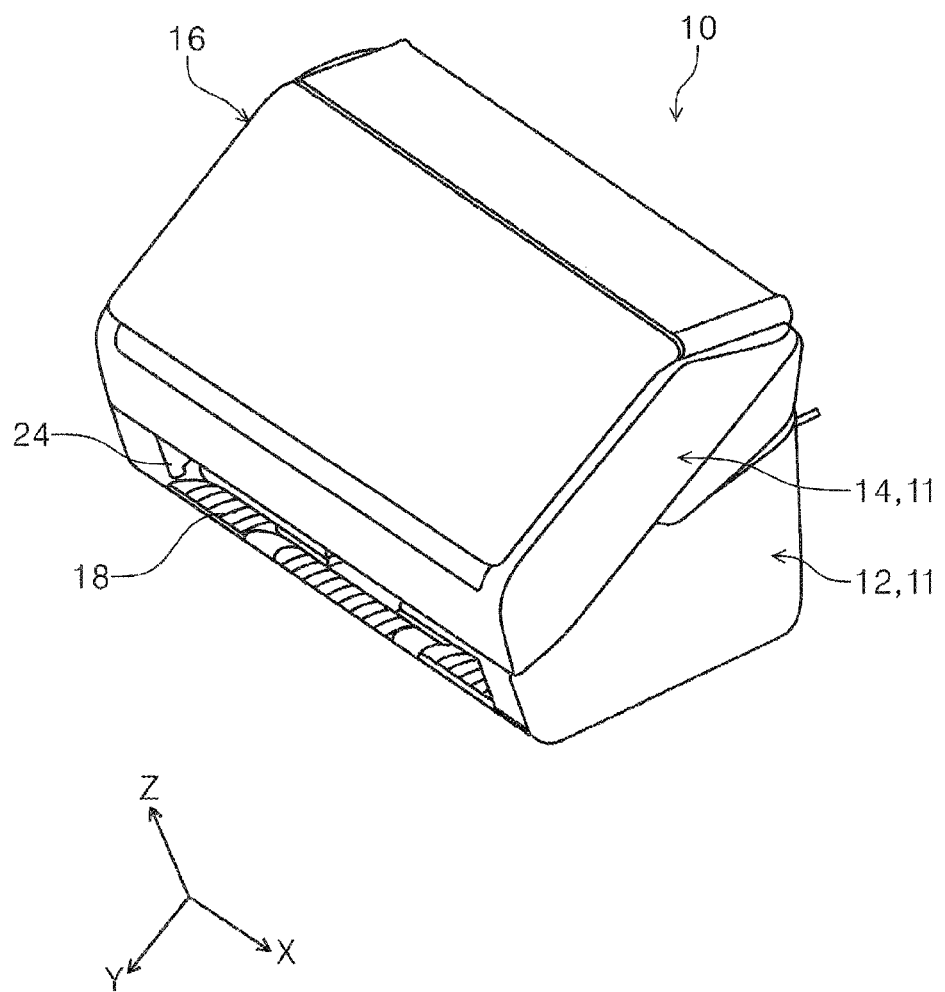
FIG. 1 is an outer appearance perspective view illustrating an example of a scanner according to the invention.
Figure 2:
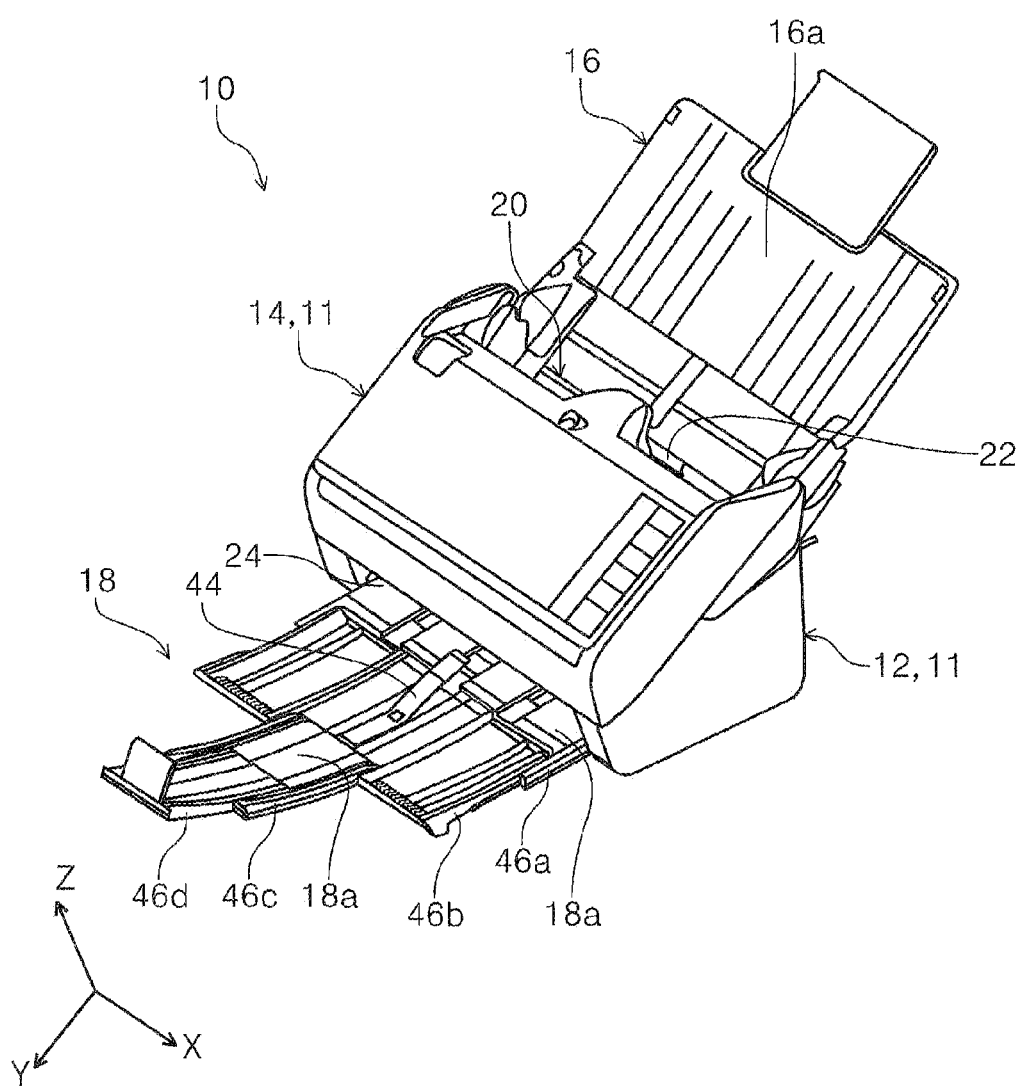
FIG. 2 is a perspective view illustrating a feeding state in the scanner according to the invention.
Figure 3:
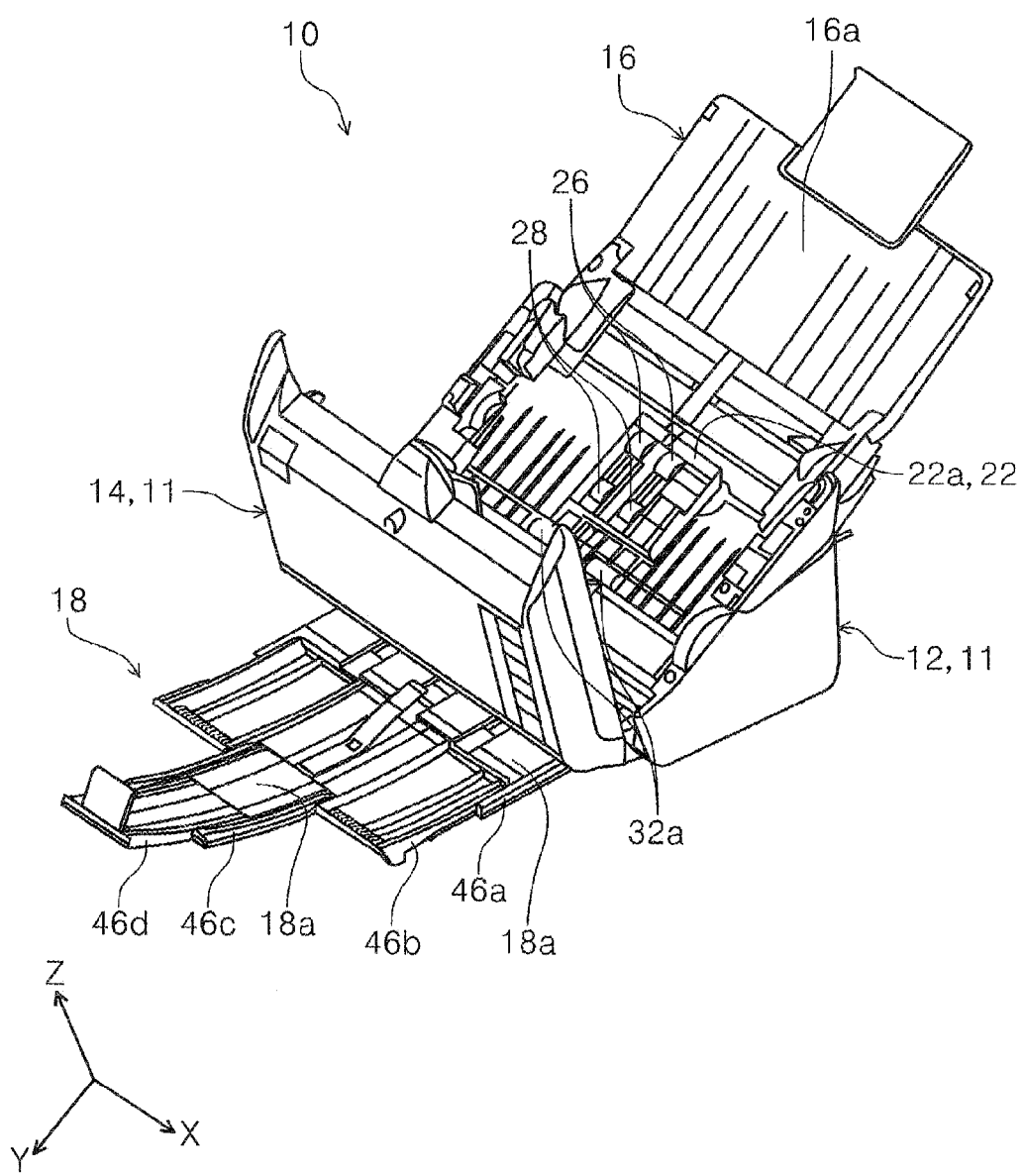
FIG. 3 is a perspective view of a case where an upper unit is in an open state with respect to a lower unit in the scanner according to the invention.
Figure 4:
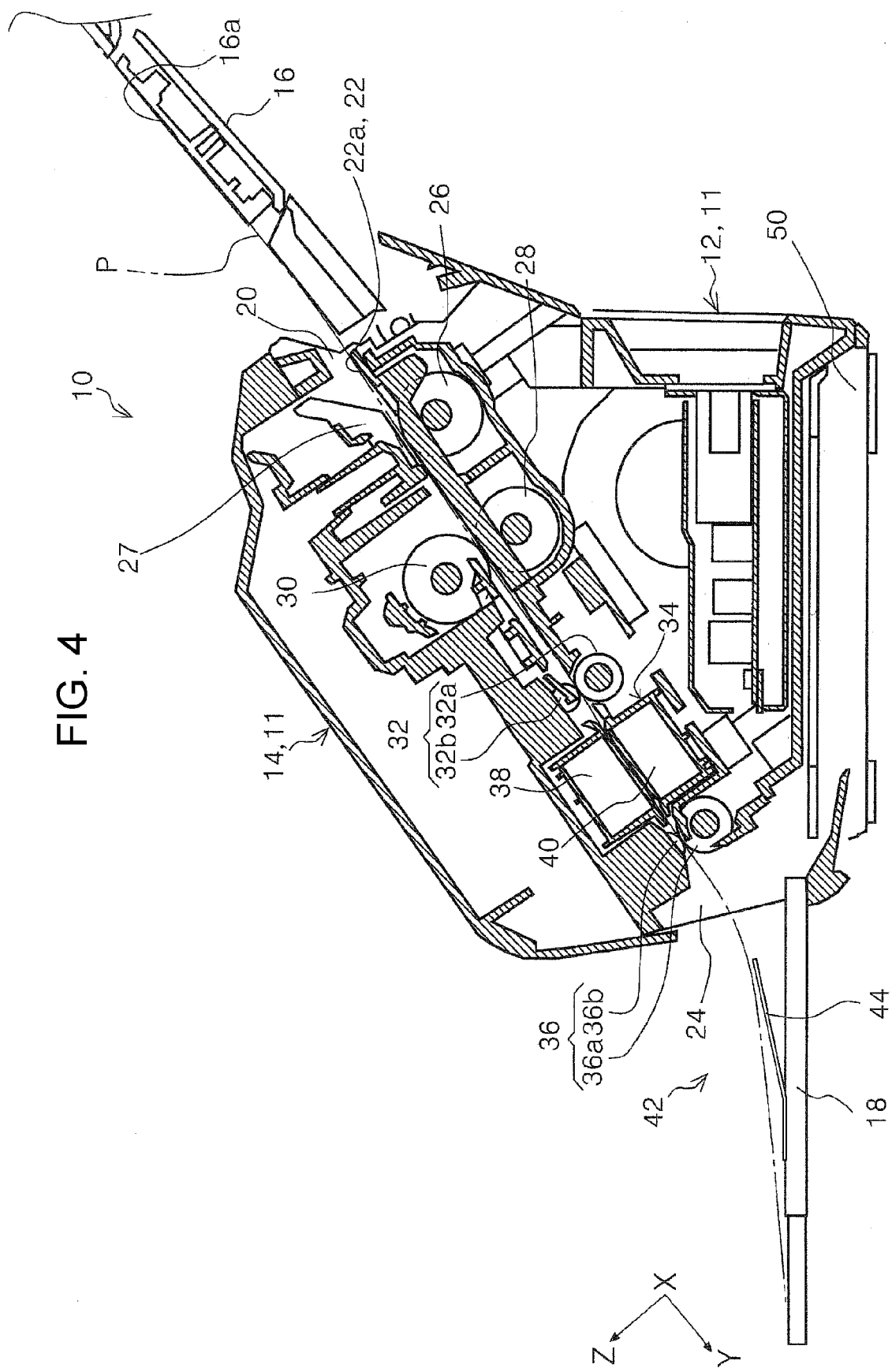
FIG. 4 is a side sectional view illustrating a feeding path in the scanner according to the invention.

FIG. 1 is an outer appearance perspective view illustrating an example of a scanner according to the invention. FIG. 2 is a perspective view illustrating a feeding state in the scanner according to the invention. FIG. 3 is a perspective view of a case where an upper unit is in an open state with respect to a lower unit in the scanner according to the invention. FIG. 4 is a side sectional view illustrating a feeding path in the scanner according to the invention.

Figure 5:
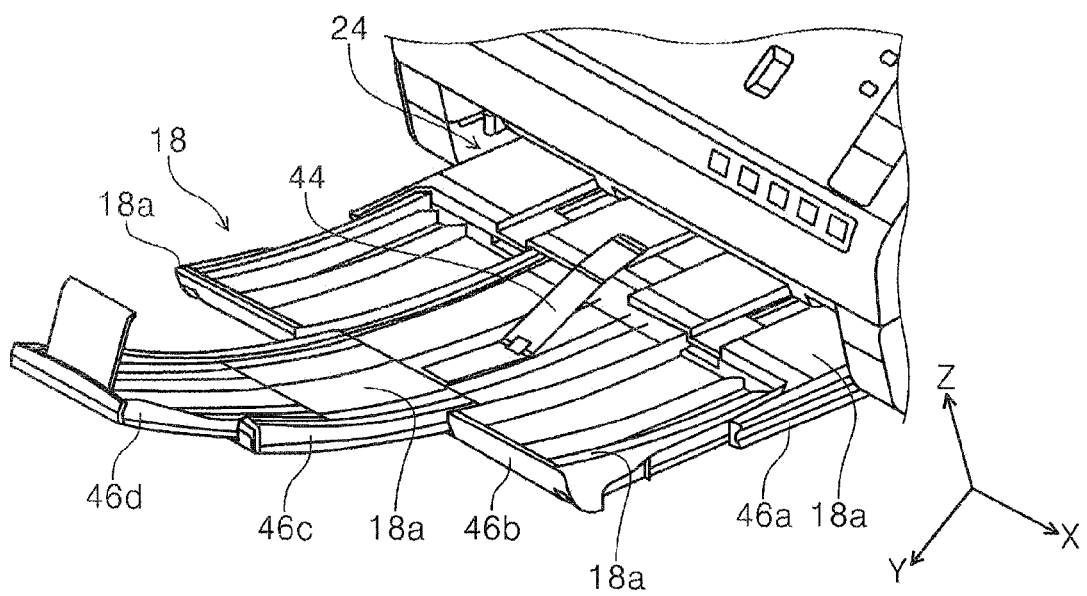
FIG. 5 is a main portion enlarged view of the scanner according to the invention.
Figure 6:
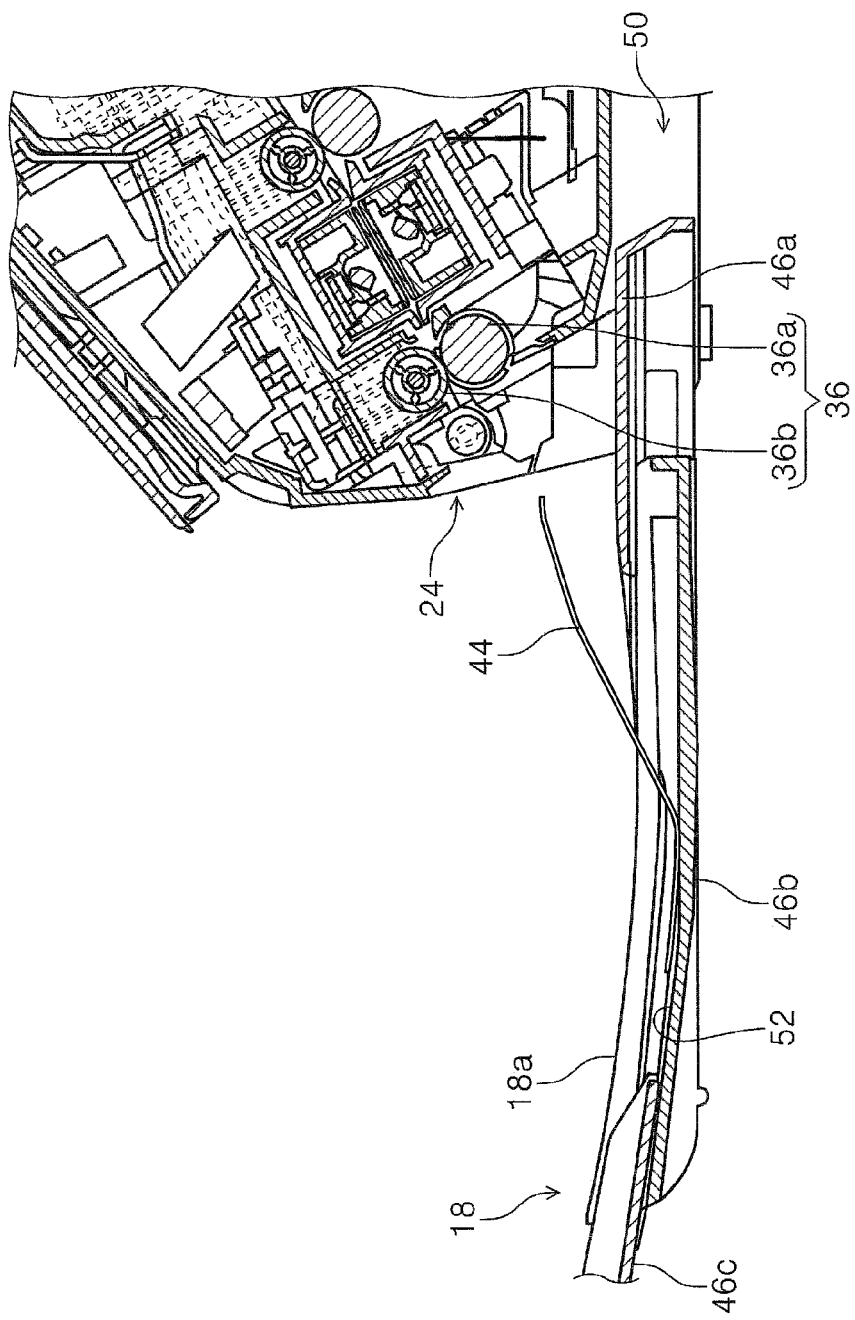
FIG. 6 is a side sectional view of a medium discharge device which is provided with the scanner.
Figure 7:
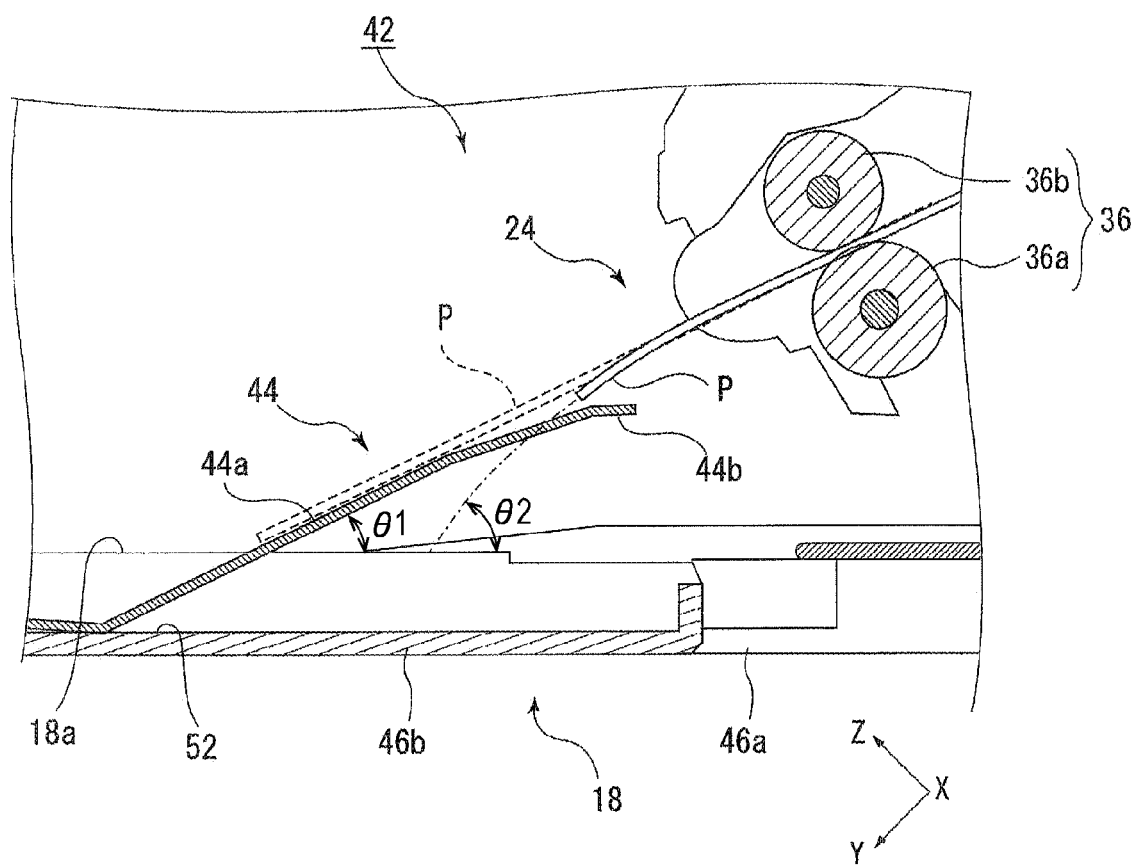
FIG. 7 is a diagram which describes a guide member in the medium discharge device.
Figure 8:
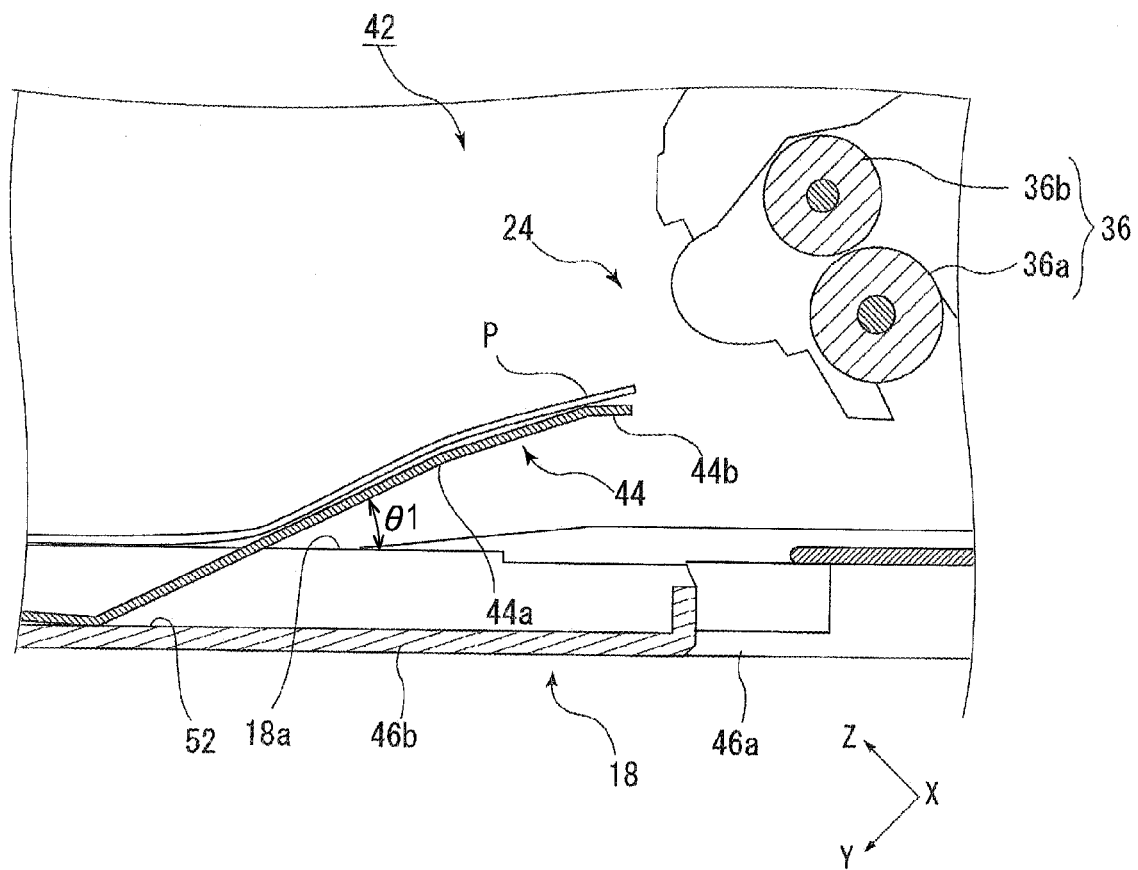
FIG. 8 is a diagram illustrating a state in which a paper sheet is guided to the guide member.
Figure 9:
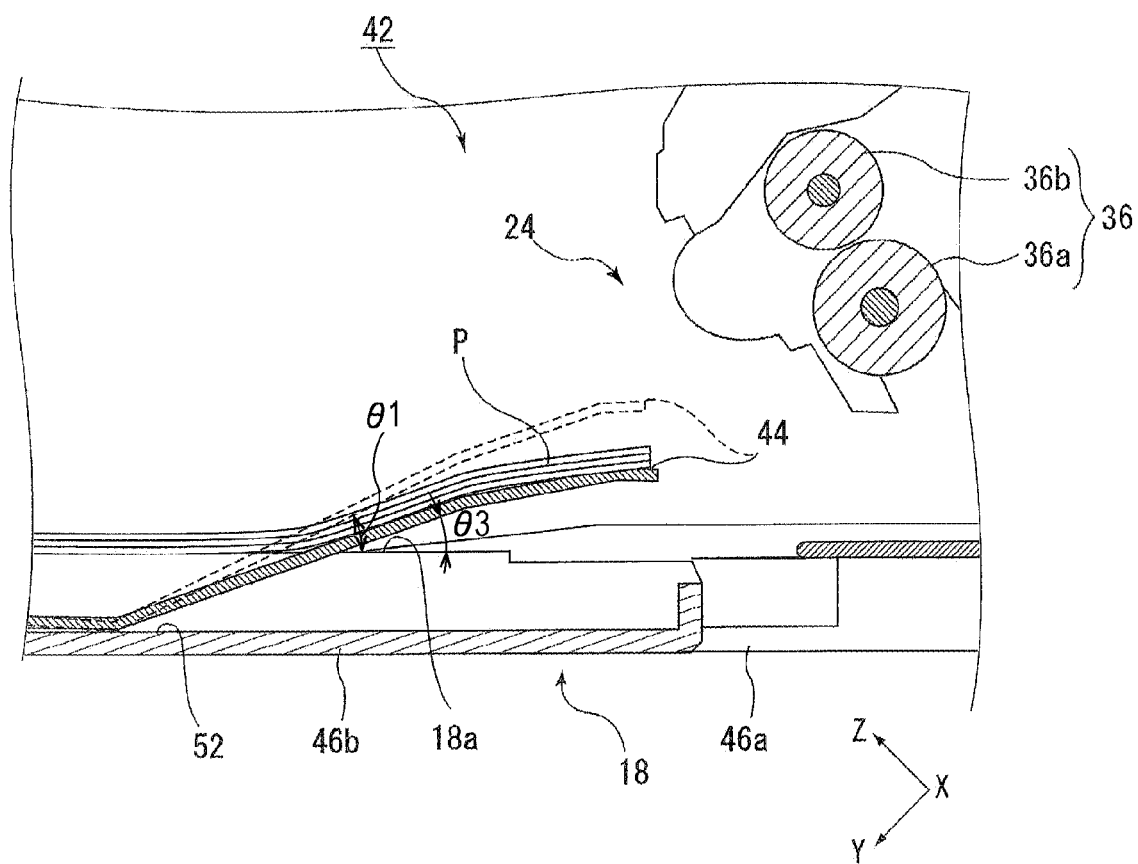
FIG. 9 is a diagram illustrating a state in which a plurality of paper sheets are mounted in the guide member.

FIG. 5 is a main portion enlarged view of the scanner according to the invention. FIG. 6 is a side sectional view of a medium discharge device which is provided in the scanner. FIG. 7 is a diagram which describes a guide member in the medium discharge device. FIG. 8 is a diagram illustrating a state in which a paper sheet is guided to the guide member. FIG. 9 is a diagram illustrating a state in which a plurality of paper sheets are mounted in the guide member.

Overview of Scanner

As shown in FIG. 1, the scanner 10 as the image reading apparatus according to the invention is provided with a lower unit 12 and an upper unit 14 which configure an apparatus main body 11 that is provided with a reading portion (image reading portion 34 described later) which reads an image of a document, a paper support 16 which opens and closes with respect to the upper unit 14, and a paper discharge tray 18 as a "medium receiving tray" that receives a paper sheet P which is discharged from the apparatus main body 11.

Note that, in an X-Y-Z coordinate system illustrated in each drawing, an X direction is a paper sheet width direction that is an apparatus width direction and a Y direction is a paper sheet transport direction. A Z direction is a direction which intersects with the Y direction, and indicates a direction which is orthogonal to a surface of the paper sheet which is generally transported. In addition, a +Y direction side is the apparatus front surface side, and a −Y direction side is the apparatus rear surface side. In addition, viewed from the apparatus front surface side, a right side is set as a +X direction and a left side is a −X direction. In addition, a +Z direction is an apparatus top (including an upper portion, an upper surface, and the like), and a −Z direction is an apparatus bottom (including a lower portion, a lower surface, and the like).

In addition, in the scanner 10, there is a configuration in which the paper sheet P as the medium is transported in the +Y direction of each drawing. Hereinafter, a direction (+Y direction side) in which the paper sheet P is transported is referred to as "downstream", and a direction which is opposite thereto (−Y direction side) is referred to as "upstream".

The upper unit 14 is attached to the lower unit 12 to be rotatable with a paper sheet transport direction downstream side as a rotary support point with respect to the lower unit 12. The upper unit 14 can take a closed state (refer to FIG. 2) which is closed with respect of the lower unit 12 and configures a paper sheet transport path of the paper sheet P along with the lower unit 12 and an open state (refer to FIG. 3) in which it is possible to easily perform a process of paper jamming of the paper sheet P by exposing the paper sheet transport path of the paper sheet P by rotating to the apparatus front surface side with respect to the lower unit 12.

In addition, the paper support 16 is provided which opens and closes the upper portion of the upper unit 14.

The paper support 16 is attached to the lower unit 12 to be rotatable with respect to the upper portion on the rear surface side of the lower unit 12. As shown in FIG. 1, it is possible for the paper support 16 to take a non-feeding state covering the upper portion and a feeding opening 20 (FIG. 2) of the upper unit 14, and as shown in FIG. 2, a feeding state in which the paper support 16 rotates to the apparatus rear surface side from the non-feeding state in FIG. 1 and a rear surface of the paper support 16 (support surface 16a described later) extends to a medium mounting member 22 of the paper sheet P while opening the feeding opening 20.

In addition, a discharge opening 24 which discharges the paper sheet P from within the apparatus main body 11 and a medium discharge device 42 are provided on the apparatus front surface side of the lower unit 12. The medium discharge device 42 is configured by a discharge roller pair 36 which will be described later, and a paper discharge tray 18 which is able to be pulled out from the discharge opening 24 toward the apparatus front surface side. It is possible for the paper discharge tray 18 to take a state (FIG. 1) of being accommodated in an accommodating portion 50 (refer to FIG. 4) which is provided on the bottom portion of the lower unit 12 and a state (FIG. 2) of being pulled out to the apparatus front surface side. In addition, the paper discharge tray 18 in the embodiment is configured by connection of a plurality of tray members 46a, 46b, 46c, and 46d, and it is possible to adjust a pull-out length from the discharge opening 24 according to the length of the discharged paper sheet P.

Note that, details of the paper discharge tray 18 and an accommodating structure of the accommodating portion 50 of the paper discharge tray 18 will be described later in detail.

Scanner Feeding Path

Next, a paper sheet transport path in the scanner 10 will be described with reference to FIG. 4.

A tip end side (downstream side) of the paper sheet P which is set in the feeding opening 20 is supported on a medium mounting surface 22a of the medium mounting member 22, and a rear end side (upstream side) is mounted supported by the support surface 16a which is a rear surface of the paper support 16 that has a posture of rotating to the apparatus rear surface side with respect to the lower unit 12. A plurality of paper sheets P are able to be set in the feeding opening 20.

The paper sheet P which is mounted on the medium mounting member 22 is fed to downstream side (+Y direction side) by being picked up by a first feeding roller 26 that is provided to be rotatable with respect to the lower unit 12 on which the medium mounting member 22 is provided. In detail, the paper sheet P is fed toward the downstream side by rotating while contacting the first feeding roller 26 on the surface facing the medium mounting surface 22a of the paper sheet P. Accordingly, in a case where the plurality of paper sheets P are set to the feeding opening 20 in the scanner 10, the paper sheets P are fed toward the downstream side in order from the paper sheets P on the medium mounting surface 22a side of the medium mounting member 22. Note that, the first feeding roller 26 is disposed such that a portion protrudes with respect to the medium mounting surface 22a of the medium mounting member 22.

The medium mounting member 22 supports the paper sheet P that is set to the feeding opening 20 further on the upstream side than the first feeding roller 26, and the medium mounting member 22 plays a role as a transport path of the paper sheet P which is fed by the first feeding roller 26 further on the downstream side than the first feeding roller 26.

In addition, a paper sheet return member 27 that is biased to the first feeding roller 26 side is provided at a position facing the first feeding roller 26, and multifeed of the paper sheet P is suppressed.

A second feeding roller 28 is rotatably provided as a "feeding roller" on the lower unit 12 at the downstream side of the first feeding roller 26, and a separation roller 30 is rotatably provided in the upper unit 14.

In the same manner as the first feeding roller 26, the second feeding roller 28 is disposed such that a portion protrudes with respect to the medium mounting surface 22a of the medium mounting member 22, the paper sheet P is fed toward the downstream side by rotating while contacting the surface facing the medium mounting surface 22a of the paper sheet P.

In the embodiment, a predetermined rotation resistance is applied to the separation roller 30. Then, in a case where two or more paper sheets P are fed by the first feeding roller 26, only the paper sheet P which is separated by the separation roller 30 and contacts the second feeding roller 28 is fed to the feeding direction downstream side due to nipping of the second feeding roller 28 and the separation roller 30.

The discharge roller pair 36 which is configured by a transport roller pair 32, the image reading portion 34 as the "reading portion", and the medium discharge device 42 is provided on the transport direction downstream side of the second feeding roller 28.

In the embodiment, the discharge roller pair 36 is provided with a discharge driving roller 36a which is provided on the lower unit 12 and a discharge driven roller 36b which is provided on the upper unit 14 and drivably rotates with respect to the discharge driving roller 36a.

The paper sheet P which is fed to the transport direction downstream side is nipped in the transport roller pair 32 nipping using the second feeding roller 28 and the separation roller 30, and is transported to the image reading portion 34 which is positioned on the downstream side of the transport roller pair 32.

The transport roller pair 32 is provided with a transport driving roller 32a which is provided on the lower unit 12 and a transport driven roller 32b which is provided on the upper unit 14 and drivably rotates with respect to the transport driving roller 32a.

Note that, in the embodiment, the first feeding roller 26, the second feeding roller 28, the transport driving roller 32a, and the discharge driving roller 36a are rotatably driven by at least one driving source 48 (FIG. 12) that is provided within the lower unit 12.

In addition, there is a configuration in which the first feeding roller 26, the second feeding roller 28, the separation roller 30, and the transport roller pair 32 are disposed on the center portion of the width direction (X axis direction) which intersects with the medium transport direction of the medium mounting member 22, positional alignment of the paper sheet P with reference to the center of the width direction of the paper sheet P is performed, and so-called center feeding is performed. Accordingly, the discharge roller pair 36 is also provided in the X axis direction center portion.

The image reading portion 34 is provided with an upper image reading sensor 38 which is provided on the upper unit 14 side and a lower image reading sensor 40 which is provided on the lower unit 12 side. In the embodiment, the upper image reading sensor 38 and the lower image reading sensor 40 are configured as a contact image sensor module (CISM) as an example.

On the paper sheet P, after an image on at least one surface of the front surface and the rear surface is read on the image reading portion 34, the paper sheet P is discharged toward the paper discharge tray 18 from the discharge opening 24 by nipping the discharge roller pair 36 that is positioned on the transport direction downstream side of the image reading portion 34. Note that, a dashed line in FIG. 4 indicates a feeding path of the paper sheet P.

Paper Discharge Tray

Next, the paper discharge tray 18 is described with reference to FIGS. 5 to 9.

The paper discharge tray 18 is provided further on the lower side than the discharge roller pair 36, and a stacking space of the plurality of paper sheets P is secured.

A guide member 44 which guides the tip end of the paper sheet P which is discharged from the discharge roller pair 36 so as to enter the medium mounting surface 18a at a predetermined angle θ1 is provided in the center portion of the width direction (X axis direction) which intersects with the medium transport direction of the paper discharge tray 18. When the paper sheet P is fed further to the downstream side after landing on the medium mounting surface 18a, the predetermined angle θ1 is set to an angle at which a concern of buckling is low on the medium mounting surface 18a.

In further detail, the guide member 44 is formed on the downward slope from the transport direction upstream side toward the downstream side, and extend at the predetermined angle θ1 with respect to the medium mounting surface 18a of the paper discharge tray 18.

The guide member 44 is elastically displaceably provided in the advancing and retreating direction (up and down direction in FIG. 6) with respect to the medium mounting surface 18a of the paper discharge tray 18. In the embodiment, elastic displacement in the advancing and retreating direction with respect to the medium mounting surface 18a is simply and inexpensively realized by forming the guide member 44 using a leaf spring.

The guide member 44 is configured so as to be displaced in a direction coming close to the medium mounting surface 18a according to raising of a pressing load due to the paper sheet P that is discharged to the paper discharge tray 18.

Next, the operation of the guide member 44 will be described. First, in a case of a medium in which resilience of the paper sheet P is high (indicated by a dotted line in FIG. 7), the paper sheet P which is fed from the discharge roller pair 36 progresses approximately straight without hanging down, and is landed on the medium mounting surface 18a at the angle θ1. Note that, normally, the medium with high rigidity is landed on the medium mounting surface 18a at the angle θ1 even if the guide member 44 is not present. The guide member 44 is provided so as not to interfere with the path of the medium with high rigidity, and in the guide member 44, the tip end portion 44b of the slope 44a is formed bent slightly on the lower side.

Meanwhile, in a case where the paper sheet P indicated by a solid line in FIG. 7 is the medium with low rigidity (medium with weak resilience) such as thin paper, the paper sheet P that is discharged from the discharge roller pair 36 tends to hang down due to self-weight, and without change, there is landing on the medium mounting surface 18a at an angle θ2 which is larger than the angle θ1 that has the trajectory indicated by a dashed line in the same drawing. However, as shown in FIG. 8, since the paper sheet P is guided to contact the guide member 44, it is possible to land the paper sheet P on the medium mounting surface 18a of the paper discharge tray 18 at the angle θ1.

Accordingly, even if the paper sheet P is the medium with low rigidity such as thin paper, it is possible to reliably land the paper sheet P on the medium mounting surface 18a of the paper discharge tray 18 at the angle θ1, and it is possible to reduce or avoid a concern of the paper sheet P buckling on the medium mounting surface 18a of the paper discharge tray 18. Thereby, it is possible to suppress a concern such that a subsequent paper sheet is jammed, the order of the paper sheets is switched, and the like, and appropriately stack the media in the paper discharge tray 18.

Additionally, the guide member 44 is elastically displaced in the direction coming close to the medium mounting surface 18a according to raising of the pressing load due to the paper sheet P that is discharged to the paper discharge tray 18. That is, when the discharged number of sheets of the paper sheet P is great, the guide member 44 is displaced so as to come close to the medium mounting surface 18a (refer to FIG. 9). Consequently, it is possible to secure a loading space in a height direction (direction perpendicular to the medium mounting surface 18a) in the paper discharge tray 18. Note that, in FIG. 9, the guide member 44 prior to displacement (angle θ1 with respect to the medium mounting surface 18a) is indicated by a dotted line. The angle with respect to the medium mounting surface 18a of the guide member 44 after displacement according to raising of the pressing load from the paper sheet P is θ3 which is smaller than θ1.

For example, the guide member 44 is able to be provided across the entire width in the width direction of the paper discharge tray 18, but it is possible to provide the guide member 44 with a simple configuration and at low cost by partially providing in the width direction in the paper discharge tray 18, and it is possible to easily perform adjustment of elastic force of the guide member 44.

In addition, it is possible to partially provide a plurality of guide members 44 in the width direction of the paper discharge tray 18 as shown in the embodiment described later.

Paper Discharge Tray Accommodating Structure

Figure 11:
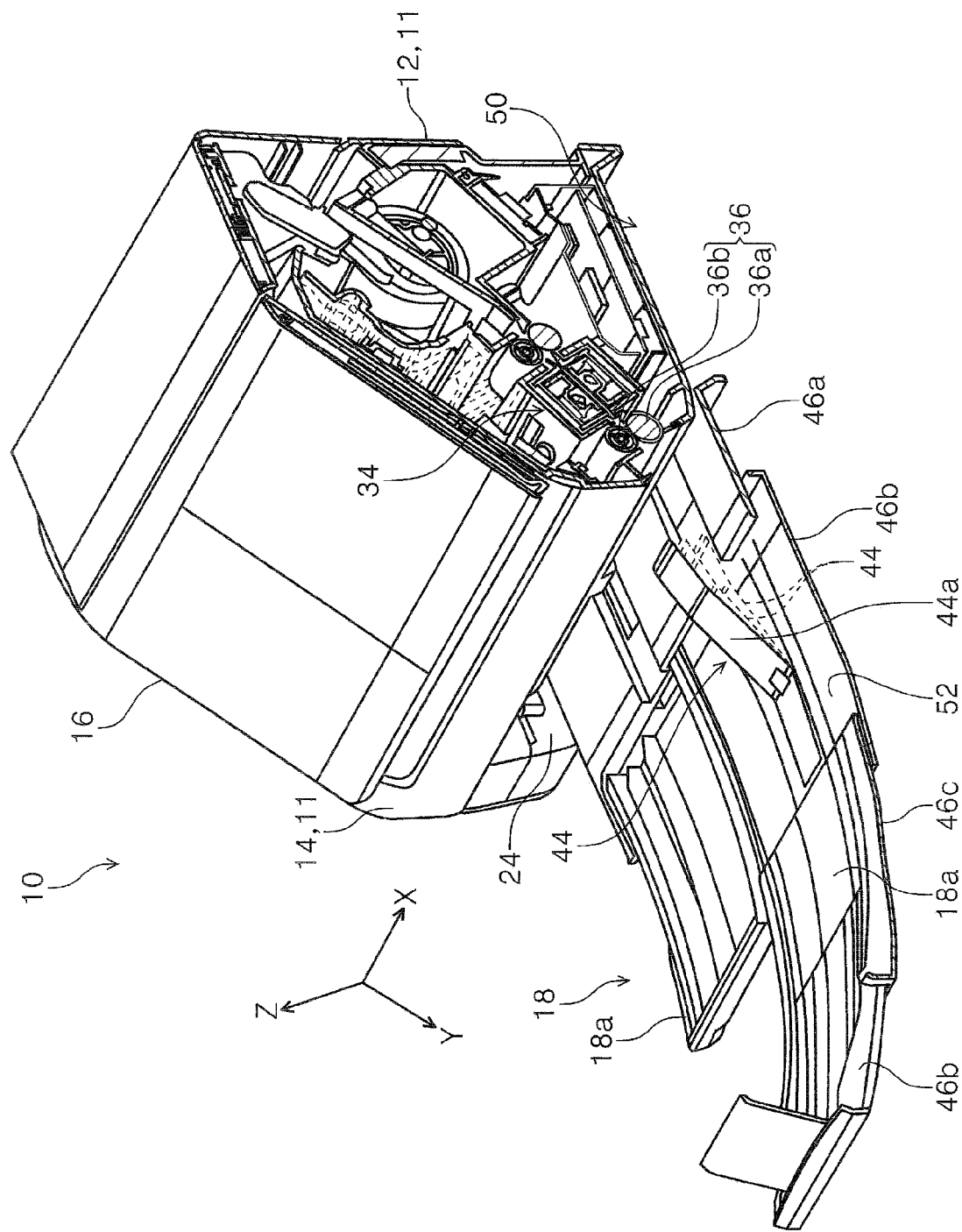
FIG. 11 is a perspective sectional view of a state in which a paper discharge tray is pulled out from the apparatus main body of the scanner.
Figure 12:
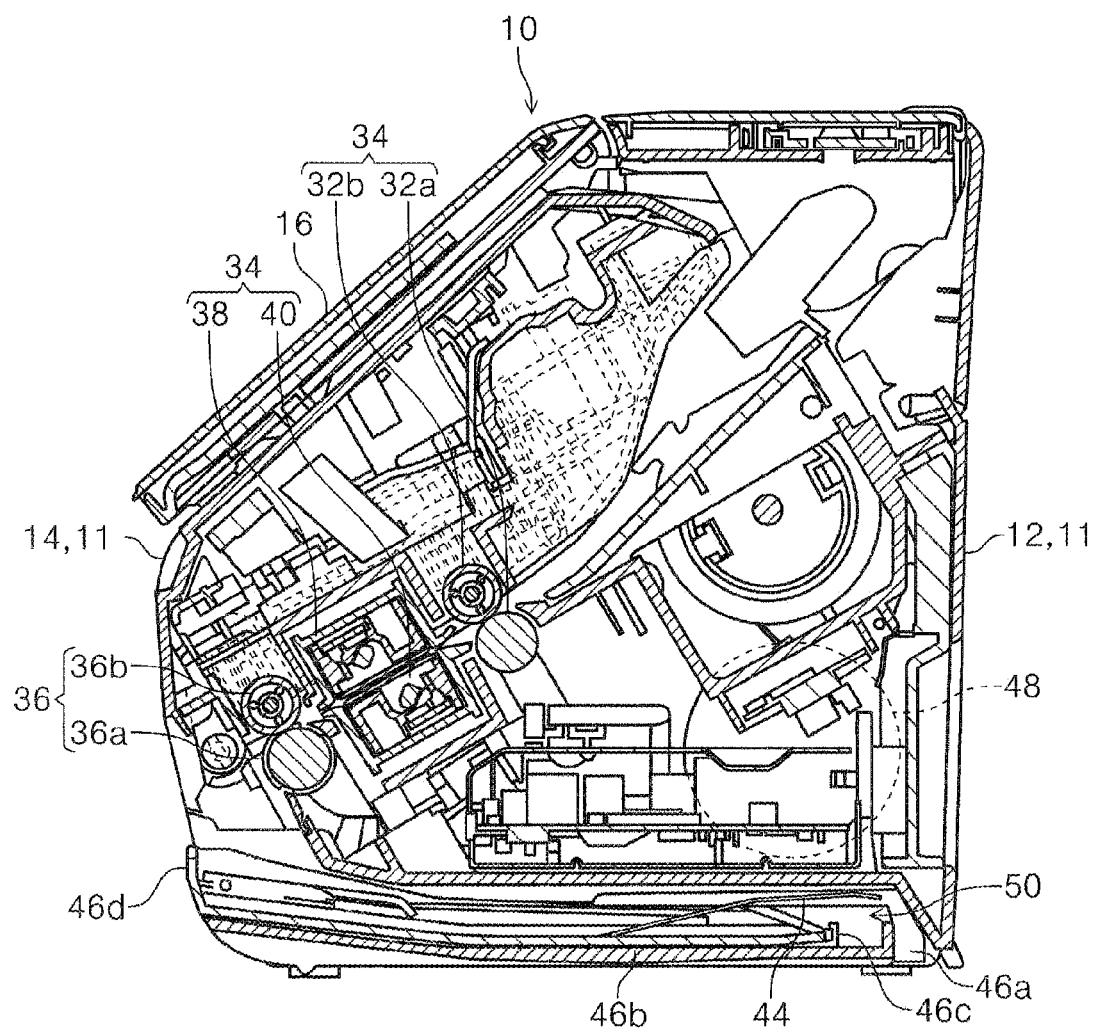
FIG. 12 is a side sectional view of a state in which the paper discharge tray is accommodated in the apparatus main body of the scanner.
Figure 12:
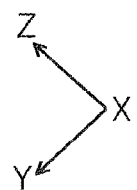

Next, an accommodating structure of the paper discharge tray 18 will be described with reference to FIGS. 11 to 12. FIG. 11 is a perspective sectional view of a state in which a paper discharge tray is pulled out from the apparatus main body of the scanner. FIG. 12 is a side sectional view of a state in which the paper discharge tray is accommodated in the apparatus main body of the scanner.

In the embodiment, the paper discharge tray 18 is accommodatable in the apparatus main body 11. In detail, the paper discharge tray 18 is configured so as to be accommodated in the accommodating portion 50 that is provided in the lower unit 12.

As described above, the paper discharge tray 18 in the embodiment is configured by connecting the plurality of tray members 46a, 46b, 46c, and 46d. As shown in FIG. 11, the tray member 46d which is positioned furthest on the downstream side is slidably provided on the upper side of the tray member 46c, and the tray member 46c is slidably provided on the upper side of the tray member 46b.

In addition, the tray member 46b is slidably provided on the lower side of the tray member 46a, and the tray member 46a in which the tray members 46b, 46c, and 46d are stored is accommodated in the accommodating portion 50 as shown in FIG. 12.

The guide member 44 is attached to the slide portion 52 that is positioned one step lower than the medium mounting surface 18a in the tray member 46b. The slide portion 52 has a space in which the tray member 46c is accommodated to slide in the tray member 46b.

When the tray member 46c is slidably accommodated in the tray member 46b, the tray member 46c is displaced in the direction coming close to the medium mounting surface 18a by pressing the slope 44a (FIG. 11) of the guide member 44 on the tray member 46c. Note that, the guide member 44 indicated by a dotted line in FIG. 11 represents the guide member 44 which is displaced in the direction coming close to the medium mounting surface 18a.

When the tray member 46c is completely accommodated in the tray member 46b, height of the guide member 44 is a height that is stored on a lower side of the tray member 46a, the tray member 46b is accommodatable in the tray member 46a, and furthermore the tray member 46a is accommodatable in the accommodating portion.

As described above, it is possible to accommodate the guide member 44 which is provided in the paper discharge tray 18 in the accommodating portion 50 that is provided within the apparatus main body 11 along with the paper discharge tray 18 in conjunction with the accommodating operation to the accommodating portion 50 of the paper discharge tray 18. Thereby, it is possible to accommodate the guide member 44 to save space.

Embodiment 2

Figure 10:
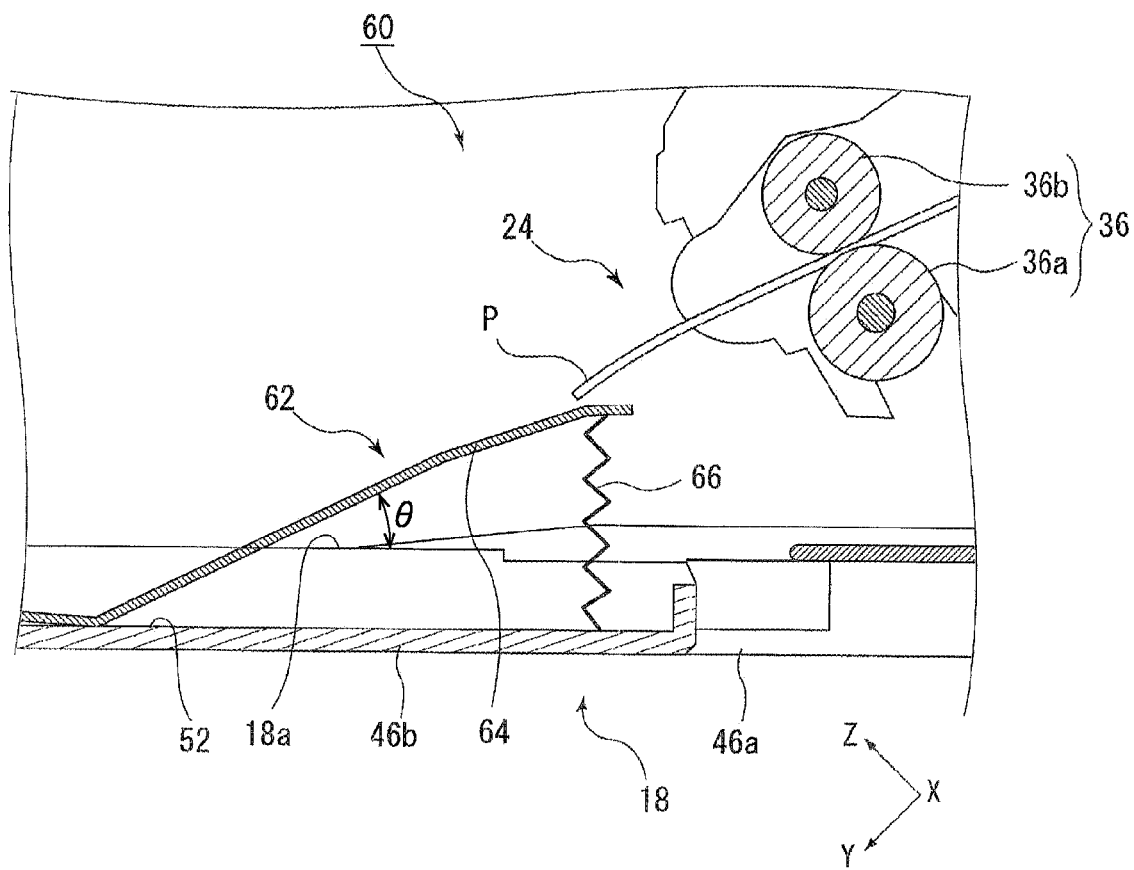
FIG. 10 is a schematic side surface view illustrating a configuration of the medium discharge device according to Embodiment 2.

In Embodiment 2, another example of the medium discharge device is described based on FIG. 10.

FIG. 10 is a schematic side surface view illustrating a configuration of the medium discharge device according to Embodiment 2. In the embodiment, the same reference numerals as in Embodiment 1 are given and description is omitted for configurations which are the same as in Embodiment 1.

In a medium discharge device 60 of the embodiment, the paper discharge tray 18 is provided with a guide member 62 as shown in FIG. 10. That is, the guide member 62 is provided with a guide plate 64 which has a guide surface of the paper sheet P and a spring member 66 which is provided between the guide plate 64 and the slide portion 52 of the paper discharge tray 18. The guide plate 64 is formed of a non-elastic material.

The guide plate 64 is configured so as to be displaced in a direction coming close to the medium mounting surface 18a against biasing force of the spring member 66 according to raising of a pressing load due to the paper sheet P that is discharged to the paper discharge tray 18.

In the same manner as Embodiment 1, in the present embodiment, regardless of the rigidity of the paper sheet P, it is possible to reliably land the paper sheet P on the medium mounting surface 18a of the paper discharge tray 18 at the angle θ1, and it is possible to reduce or avoid a concern of the paper sheet P buckling on the medium mounting surface 18a of the paper discharge tray 18. Thereby, it is possible to suppress a concern such that a subsequent paper sheet is jammed, the order of the paper sheets is switched, and the like, and appropriately stack the media in the paper discharge tray 18.

In addition, even in the present embodiment, it is possible to configure the guide member 62 to be accommodated in the accommodating portion 50 along with the paper discharge tray 18 in conjunction with the accommodating operation to the accommodating portion 50 of the paper discharge tray 18.

Embodiment 3

Figure 13:
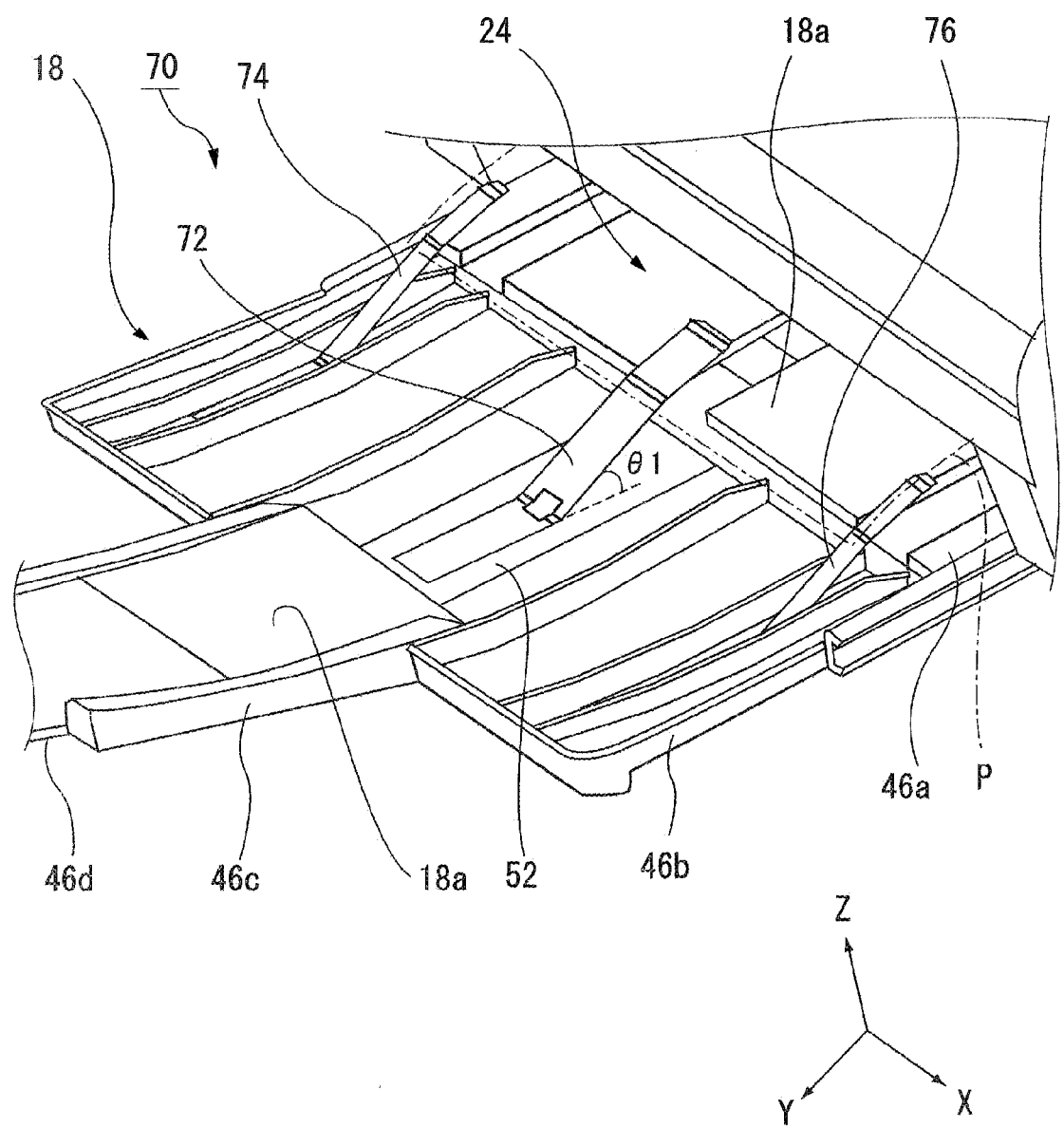
FIG. 13 is a perspective view illustrating the main portion of the medium discharge device according to Embodiment 3.

In Embodiment 3, yet another example of the medium discharge device is described based on FIG. 13. FIG. 13 is a perspective view illustrating the main portion of the medium discharge device according to Embodiment 3.

In a medium discharge device 70 of the embodiment, the paper discharge tray 18 is provided with three guide members 72, 74, and 76. In detail, a guide member 72 which is provided on the center portion of the paper discharge tray 18, a guide member 74 which is provided in an end portion on the left side (−X side) of the guide member 72 viewed from the apparatus front surface side of the paper discharge tray 18, and the guide member 76 which is provided on the end portion on the right side (+X side) of the guide member 72 are provided.

In a case where a size of the width direction (X axis direction) of the discharged paper sheet P is large, or resilience of the medium is weak (rigidity is low), when the paper sheet P is supported by only the guide member 72 of the center portion, the side end of the paper sheet P may hang down due to self-weight and the tip end of a side edge of the paper sheet P may be landed on the medium mounting surface 18a further on the tip than the tip end of the center portion of the paper sheet P at an angle larger than the angle θ1.

In the embodiment, since a part near the side edge of the paper sheet P with a large width size is able to be supported by the guide members 74 and 76 by providing the guide members 74 and 76 at the end portion side in the width direction of the paper discharge tray 18, it is possible to reduce a concern that the tip end on the side edge of the paper sheet P as described above is landed at the medium mounting surface 18a in advance. Thereby, it is possible to reliably land the paper sheet P on the medium mounting surface 18a of the paper discharge tray 18 at the angle θ1.

Note that, in the embodiment, a leaf spring which configures the center guide member 72 is formed to be wider than a leaf spring which configures the guide members 74 and 76, and although elasticity is set to be high, it is also possible to set elasticity of the three guide members 72, 74, and 76 to be the same.

In addition, it is also possible to dispose three or more guide members in the width direction. A case where a plurality of guide members are provided is not limited to a case of providing in contrast to the center portion in the width direction of the paper discharge tray 18.

Embodiment 4

Figure 14:
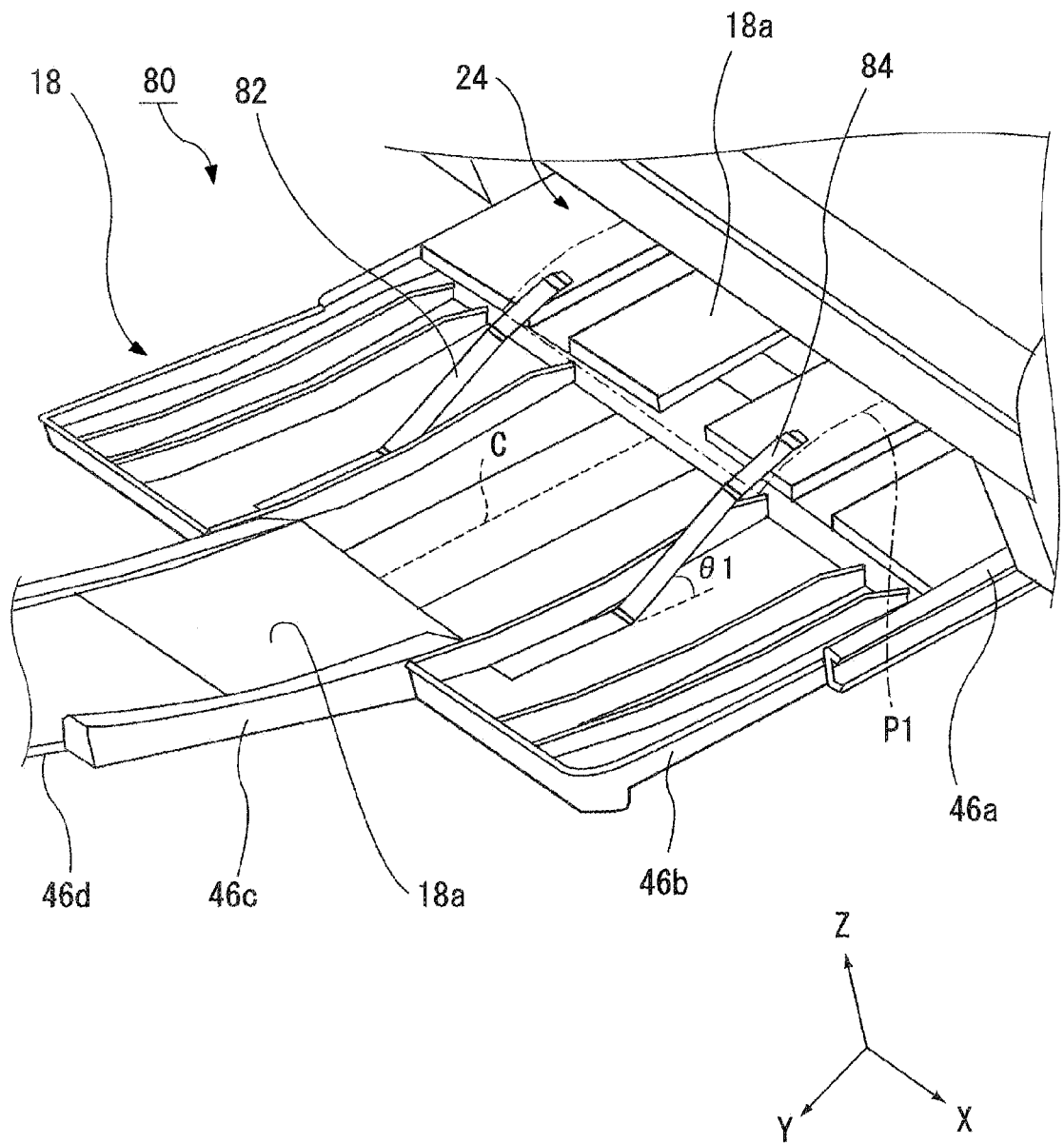
FIG. 14 is a perspective view illustrating the main portion of the medium discharge device according to Embodiment 4.
Figure 15:
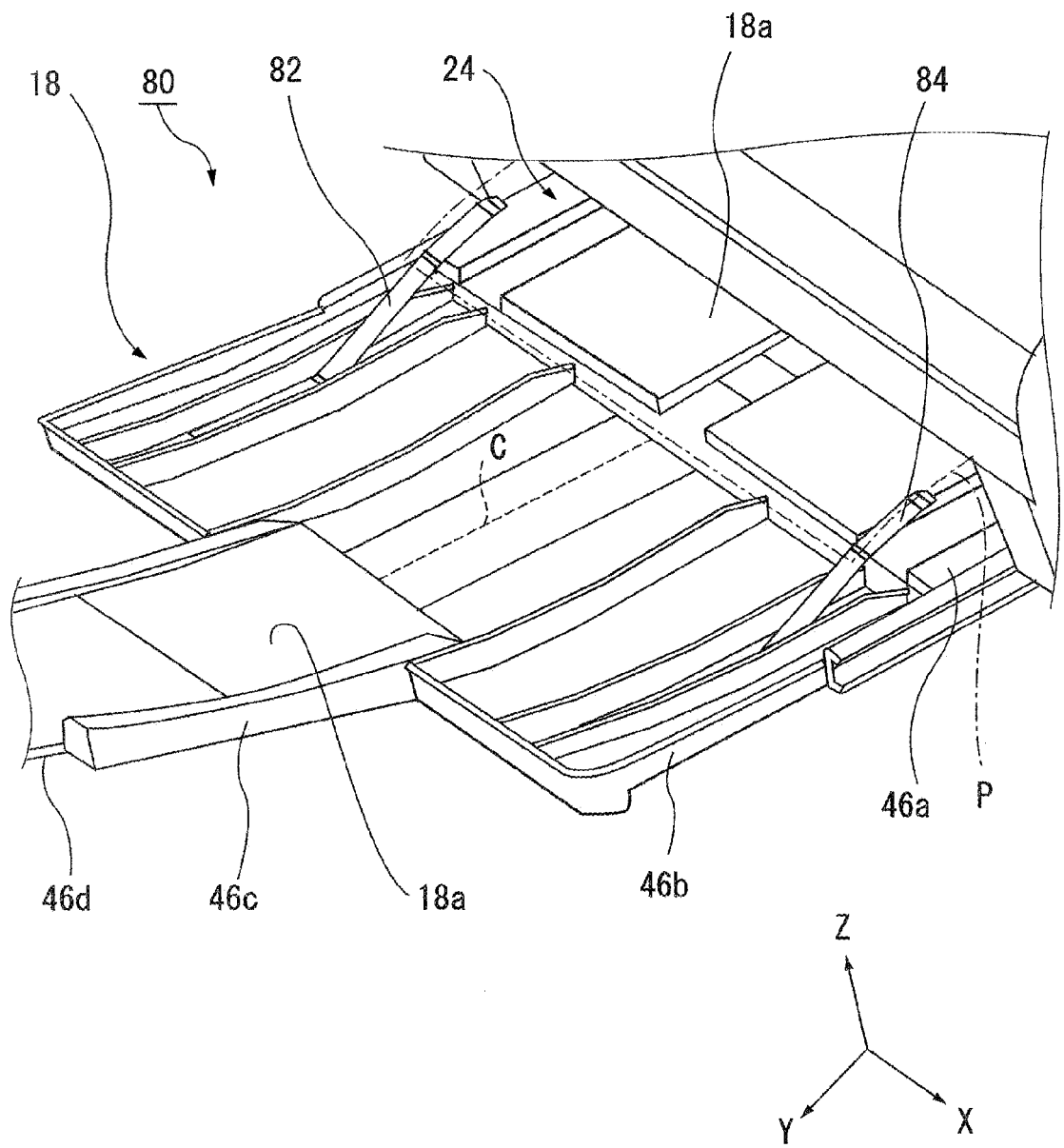
FIG. 15 is a perspective view describing another example of the medium discharge device according to Embodiment 4.

In Embodiment 4, yet another example of the medium discharge device is described based on FIGS. 14 and 15. FIG. 14 is a perspective view illustrating the main portion of the medium discharge device according to Embodiment 4. FIG. 15 is a perspective view describing another example of the medium discharge device according to Embodiment 4.

In a medium discharge device 80 of the embodiment, guide members 82 and 84 are provided on the paper discharge tray 18 at both sides in the width direction (X axis direction) with respect to a center portion C in the width direction.

In the embodiment, the guide members 82 and 84 are provided at a position to which the document (paper sheet P1) of a minimum size that is able to be read in the scanner 10 is guided.

In the embodiment, since the paper sheet P is supported and guided by two guide members 82 and 84, it is possible to realize transport of the paper sheet more stably.

Note that, in the case of the scanner 10 of the center feeder in the manner of the embodiment, it is preferable to position the guide members 82 and 84 at a target with respect to the center portion C of the transported paper sheet P, that is, position at equal distance from the center portion C.

In addition, in a case where the read document size is fixed in the scanner 10 and the paper sheet P of a determined size is discharged by the medium discharge device 80, as shown in FIG. 15, the two guide members 82 and 84 may be disposed at a position according to the size of the paper sheet P.

Embodiment 5

Figure 16:
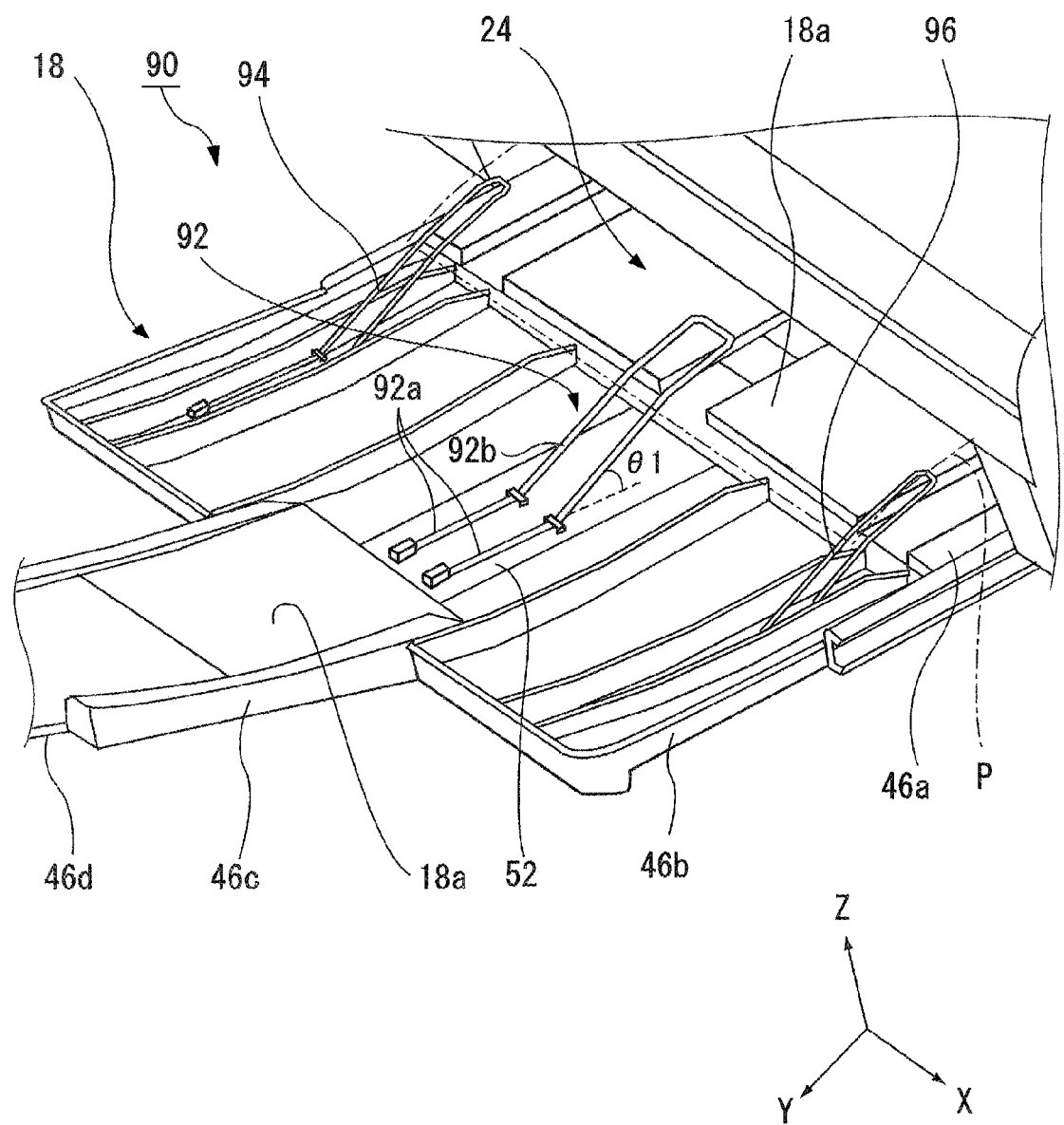
FIG. 16 is a perspective view illustrating the main portion of the medium discharge device according to Embodiment 5.
Figure 17:
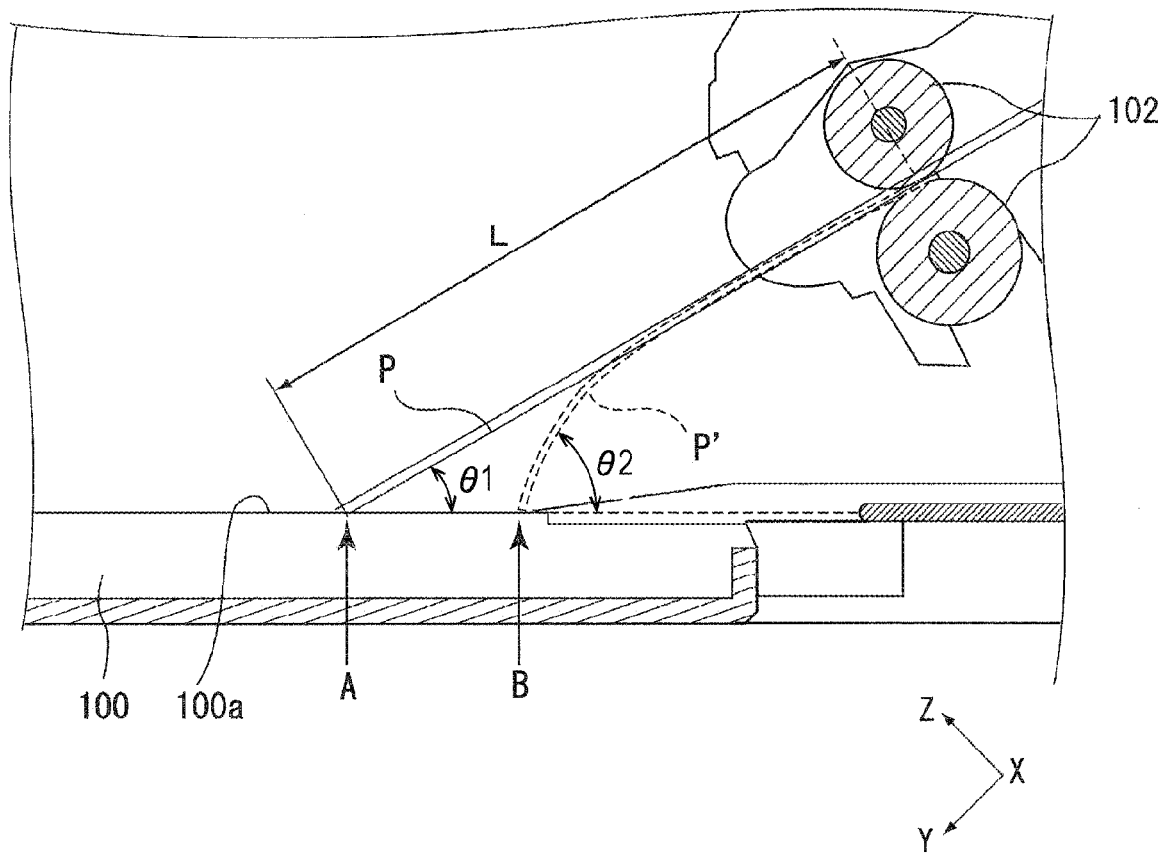
FIG. 17 is a diagram describing the related art.

In Embodiment 5, yet another example of the medium discharge device is described based on FIG. 16. FIG. 16 is a perspective view illustrating the main portion of the medium discharge device according to Embodiment 5.

In each embodiment that is described previously, although the guide member (for example, the guide member 44 of Embodiment 1) which is formed using the leaf spring is described, it is also possible to form the guide member according to the invention using a wire having elasticity such as a steel wire.

As shown in FIG. 18, a guide member 92 of a medium discharge device 90 of the embodiment is formed by bending the wire into an approximate U shape when viewed from the Z axis direction, and is provided with two foot portions 92a as an attachment portion to the slide portion 52 of the tray member 46b and a spring portion 92b in which a part that extends to two foot portions 92a that are attached to the slide portion 52 is bent at an angle θ1 in a direction (+Z side) which is separated from the slide portion 52.

The guide members 94 and 96 which are provided at both end portions in the width direction of the paper discharge tray 18 are formed by bending the wire in the same manner as the guide member 92.

In this manner, also according to the formed guide members 92, 94, and 96, it is possible to reliably land the paper sheet P on the medium mounting surface 18a of the paper discharge tray 18 at the angle θ1, and it is possible to reduce or avoid a concern of the paper sheet P buckling on the medium mounting surface 18a of the paper discharge tray 18.

It is possible to further reduce weight of the guide members 92, 94, and 96 by forming the guide members 92, 94, and 96 using wire that has elasticity.

In addition, since adjustment of elastic force of the guide members 92, 94, and 96 is possible by changing wires with different elastic force (change thickness and material of the wire), or changing bending width of the wire, design freedom of the guide members is increased.

Note that, it is also possible to form the guide members 92, 94, and 96 using one wire without bending the wire in a U shape.

Note that, in each embodiment that is described above, the scanner 10 which feeds the paper sheet P using the center feeding method is described as an apparatus which is provided with the medium discharge device according to the invention, but it is also possible to adopt in an apparatus in which the paper sheet P is fed using a biasing method with reference to positional alignment of one side edge of the paper sheet P.

In addition, the medium discharge device according to the invention is not limited to a case of being provided with the scanner 10, and it is possible to provide various apparatuses with a configuration in which a plurality of sheets of a medium such as a paper sheet are continuously discharged from the within the apparatus main body and stacked. For example, it is also possible to adopt a medium discharge device of a recording apparatus which is represented by a printer that performs recording on the paper sheet as the medium.

In addition, the invention is not limited to the embodiments described above, and various modifications are possible within the scope of the invention described in the claims which can be said to include the inventions included in the scope of the invention.

What is claimed is:

1. An image reading apparatus comprising:
a document support section for placing a document in an inclined position;
a feeding roller for feeding the document obliquely downward;
a reading section for reading the document fed from the feeding roller;
a discharge roller that discharges the read document in a first direction;
a discharge tray that receives the document discharged from the discharge roller; and
a plurality of displacement members that are provided on the discharge tray;
wherein at least one of the displacement members is provided on both sides in a second direction with respect to a center portion in the second direction which intersects with the first direction,
wherein each displacement member has a tip end, a base end provided downstream of the tip end in the first direction, and a first inclined portion, provided between the base end and the tip end, which guides the discharged document and each displacement member is configured to be displaceable in a vertical direction,
wherein the tip end is provided at the highest portion of the displacement member in the vertical direction, and wherein the displacement member includes the first inclined portion and a second inclined portion whose inclines are different.

2. The image reading apparatus according to claim 1, wherein each displacement member is biased by a spring and displaced by a force of the discharged document being received by the discharge tray.

3. The image reading apparatus according to claim 2, wherein each displacement member is formed of a non-elastic member.

4. The image reading apparatus according to claim 1, wherein a plurality of ribs extending in the document first direction are formed in the discharge tray, and each displacement member is formed between the ribs.

5. The image reading apparatus according to claim 1, wherein the discharge tray has a wall portion projecting upward from an end portion of the discharge tray.

6. The image reading apparatus according to claim 1, wherein each displacement member has the tip end as a free end.

7. The image reading apparatus according to claim 1, wherein the base end is attached to the discharge tray and the tip end is displaceable.

* * * * *